United States Patent Office 2,970,061
Patented Jan. 31, 1961

2,970,061
BUILDING UNITS AND METHOD OF PRODUCING THE SAME

William H. Burnett, 14 W. 1st St., Hutchinson, Kans.

No Drawing. Filed Dec. 11, 1957, Ser. No. 701,976

11 Claims. (Cl. 106—71)

This invention relates to the building arts and has for its primary object the provision of a method of producing a ceramic building unit having high strength to weight characteristics and which is also superior in insulating properties over currently used structures.

The most important object of the present invention is the provision of a method of producing building units utilizing commercially available bonding agents and aggregates which are adapted to be fired in a suitable kiln so that the block is truly ceramic in nature, yet does not warp, shrink or crack during firing, as has been the case in the production of previously proposed building units formed of clay or the like.

Also an important object of the present invention is to provide a method of producing a unit as described wherein materials are utilized which sinter during the firing process to thereby permanently bond the particles of aggregate used together and present a composite unit having high strength to weight characteristics, as well as insulating properties, and which may thereby be utilized to fabricate structures through the use of conventional mortars or the like.

A further important object of this invention is the provision of a method of producing a building unit which is adapted to be fired in a kiln to thereby produce a ceramic unit, and wherein the vesicular aggregate has a higher median fusion temperature than the bonding fractions so that upon firing of the unit at a temperature above the median fusion temperatures of the bonding fractions and below the median fusion temperature of the vesicular aggregate, the particles of the bonding fraction fuse and permanently bond the particles of aggregate together without fusion of the aggregate, which thereby permits the unit to be formed without warping, shrinking or cracking of the same at any time during the process.

An additional important aim of the present invention is to provide a method of producing a building unit wherein a swelling bentonite is utilized to impart sufficient plasticity and cohesion to the moist particles of aggregate so that the same may be readily molded into a self-sustaining unit prior to firing thereof, and which subsequently sinters during the heat treatment to act as a binder permanently bonding the particles of aggregate together.

Also an important object of the invention relates to the provision of a method of producing a building unit wherein the bentonite is completely expanded prior to introduction of aggregate and other bonding materials into the same so that perfect distribution of the bentonite among the particles of aggregate and other bonding materials is assured prior to forming of the admixture into a building unit.

Other important objects of the invention relate to the provision of a method as described wherein a volcanic ash material is incorporated into the admixture prior to molding and firing thereof, and which has a median fusion temperature approximating that of the bentonite so that the volcanic ash material also sinters during firing of the unit and in conjunction with sintering of the bentonite, to provide additional bonding material for permanently tacking the particles of aggregate together upon completion of the firing process; to the provision of a method wherein a fluxing agent is added to the admixture of materials to lower the median fusion points of the bentonite and the volcanic ash material and thereby permit the utilization of pre-fired, bloated, vesicular aggregates having median fusion temperatures much closer to the corresponding temperatures of the bentonite and the volcanic ash material than would ordinarily be possible in a firing process as now contemplated; to the provision of a process as described wherein a plasticizing agent may be incorporated into the admixture of materials to preclude formation of cracks or fissures during molding thereof and prior to firing of the same; to the provision of a method wherein the molded units are dried at a predetermined temperature so as to assure complete removal of all moisture from the unit without the formation of fissures or cracks in the latter as the vapor escapes therefrom; to the provision of an improved method of producing building units as disclosed in my applications, Serial No. 363,946, filed June 24, 1953, under the title of "Building Block and Method of Producing the Same," now abandoned, and my copending application Serial No. 688,097, filed October 3, 1957, under the title of "Building Units and Method of Producing the Same," of which the present application is a continuation-in-part; and to other objects and details of the present method as well as of the building unit itself, which will become obvious as the following specification progresses.

Briefly, the present invention involves introducing a predetermined proportion of a bentonite capable of swelling in the presence of moisture into a sufficient volume of water to completely expand the bentonite; admixing the colloidalized bentonite with a quantity of a finely divided volcanic ash material and a predetermined amount of particulate ceramic aggregate such as a prefired, bloated, vesicular clay, shale, slag, slate, mica or volcanic rock or mixtures thereof; forming the admixture into a predetermined shape or unit by utilization of a suitable machine such as a vibration mold; drying the molded unit to remove substantially all of the moisture therefrom without the formation of fissures or cracks therein; and subsequently firing the dried unit at a temperature below the median fusion temperature of the particles of aggregate and above the sintering temperatures of the bentonite and the volcanic ash to thereby fuse the bentonite and the volcanic ash material and permanently bond the particles of aggregate together to present a ceramic unit of high compressive strength, having a low coefficient of expansion and possessing superior insulating properties.

The first step of the present method contemplates introducing a predetermined proportion of a bentonite capable of swelling in the presence of moisture into a sufficient volume of water to completely expand the bentonite. For example, if the bentonite is of that variety capable of swelling to 16 times its original volume in the presence of water, then 16 parts by weight of water should be added to each part by weight of bentonite. The bentonite-water admixture should be thoroughly agitated to assure complete saturation of the expanded substance with the water, and to thereby form a slurry which is adapted to be admixed with the volcanic ash material and particulate aggregate substances to be hereinafter set forth. The bentonite may be introduced into water at room temperature and the desired wetting of the substance will be obtained but, if desired, the entire operation may be effected in less time by maintaining the temperature of the water at 212° F. prior to introduction of the bentonite and then during agitation of the admixture.

The bentonite which is utilized as a part of the bonding fraction in production of the present building unit has two important functions. The bentonite, because of its water absorbing characteristics, operates to maintain the volcanic ash material and aggregate in a cohesive mass adapted to be molded to present a self-sustaining unit and which will thereby maintain such unit in its original shape after removal from the mold and until moisture contained therein has been driven off during the drying process. Subsequently, during firing of the unit at a predetermined temperature which is sufficient to sinter the bentonite and volcanic ash material and not the major proportion of the particles of aggregate, the fused bentonite tacks the particles of aggregate together and thereby cooperates with the sintered volcanic ash material referred to above to present a composite ceramic unit having the desired physical properties.

The bentonite which is suitable for the present process is a finely divided material composed mainly of clay minerals of the montmorillonite group, and is generally formed by the devitrification and accompanying chemical alteration of a glassy, igneous material, usually a tough or volcanic ash. Bentonites of the swelling type which expand to several times their original volume when in contact with water will remain in suspension in water and form a gel when allowed to set and form a colloidal type of suspension. The main constituent of swelling bentonite, montmorillonite, falls into that group of clay minerals which include the following: montmorillonite (hydrous aluminum silicate), beidellite (hydrous aluminum silicate), saponite (hydrous iron-aluminum silicate), montronite (hydrous iron-aluminum silicate), and hectorite (hydrous magnesium-lithium silicate). These minerals vary in composition principally by the exchange of sodium and calcium atoms for the other elements normally present, and this accounts for their swelling characteristics in the presence of water. For example, the crystal structure of the montmorillonite group consists of two silicon-oxygen sheets with an aluminum-oxygen sheet sandwiched therebetween. When water molecules enter between adjacent sheets of the sodium bentonite crystal, the lattice structure of the bentonite molecule exands in one direction and the bentonite swells, some varieties of bentonite swelling up to over twenty times their original volume. The expansive property of the lattice seems to be related to the exchangeable atoms, sodium and calcium, it having been found the presence of sodium favors extreme swelling, whereas exchangeable calcium somewhat reduces the swelling ability of the particular bentonite.

Bentonite, depending upon the amount of impurities present, loses most of its colloidality (its ability to form a colloid in water) at temperatures ranging from 700° F. to 1500° F. Most of the relatively pure bentonites, which are especially operable in the present invention, swell to approximately 16 times their original volume in the presence of water and lose their colloidality at approximately 1300° F.

The pre-fired, finely divided volcanic ash material which is utilized in conjunction with the bentonite as a bonding agent and which, together with the colloidalized bentonite, presents a bonding fraction, is preferably a volcanic ash which has been fired in the volcano and which may be subsequently fired again to produce a vesicular material if desired, the most important characteristic of the same being that it has a median fusion temperature substantially approximating that of the sintering temperature of the bentonite.

The most suitable volcanic materials have been found to be pumicite, pumice, an artificially fired and expanded pumicite known commercially by the name exfoliated pumicite and, for some applications, perlite.

Volcanic ash or pumicite is the finest material blown into the air from explosive types of volcanoes and, for this reason, is sometimes known by the term volcanic dust. It generally comes from an acidic or intermediate magma which, on crystallization, would have produced a rhyolite or granite had the molten magma overflowed the cone of the volcano rather than being blown into the air during an explosion within the interior of the volcano. The rapid cooling of the small particles of magma blown into the air during violent eruption of the volcano prevents formation of minerals and results in finely divided volcanic ash material which is in reality volcanic glass or shard having the property of expanding or popping when subjected to a sufficient firing temperature.

The volcanic glass or volcanic ash generally known as pumicite and which is especially adapted to be utilized as a part of the bonding fraction in the present process contains a substance generally termed magmatic water and which may be driven off under the influence of heat in a furnace, thus leaving a round, expanded particle many times the original size and of light weight. Pumicite, the preferred material of the instant invention, is found in various deposits principally in Texas, Oklahoma, Kansas, Nebraska and California, and is usually sufficiently finely divided in the condition the same comes from the point of mining that the material may be used without further grinding and the like and thus, usually will pass through a 325 mesh screen with particles of various gradations. The importance of the various gradations of particle size will be set forth more fully hereinafter, but it is to be noted that the deposits found in the Plains States are believed to have been formed from volcanoes in New Mexico and then air-borne over large distances to their present sites.

Mineral compositions of the different samples of volcanic ash material received from different sites range from 50% to 98% glass shards, minute quantities to 25% quartz, very small amounts to 6% or 7% orthoclase, and up to 15% clay aggregates. Because the particle size of the pumicite will vary from extremely fine to upwards of 0.25 mm. in diameter, the actual fusion temperature of the volcanic ash material ranges from as low as 1300° F. up to approximately 2200° F. The median fusion temperature of most of the volcanic ash deposits found to be operable in the present invention approximates 1600° F. because of the fact that the very smallest particles tend to fuse at a lower temperature than the larger particles, inasmuch as heat penetrates into the interior of the smaller particles more readily and thus the particles tend to sinter at a higher rate and at a much lower temperature. A representative analysis of two types of pumicite is set forth in the table below, the raw volcanic ash as the same comes from the deposit being specified in the first column while the second column contains an analysis of an artificially exfoliated pumicite:

| | Raw Volcanic Ash, percent | Exfoliated Material, percent |
| --- | --- | --- |
| Loss on ignition | 4.25 | 1.73 |
| Silica | 76.65 | 76.25 |
| Alumina | 13.15 | 13.94 |
| Iron | 1.23 | 1.69 |
| Calcium oxide | 0.45 | 1.43 |
| Magnesium oxide | 0.06 | 0.10 |
| Sulfur trioxide | 0.10 | 0.13 |
| Alkalies | 4.21 | 4.73 |
| | 100.00 | 100.00 |

The particular pumicite that is to be used in conjunction with the bentonite as a bonding fraction will depend upon the final product desired, it being noted that the exfoliated variety is more advantageous in the formation of highly vesicular units having a very low coefficient of thermal conductivity but at some sacrifice in structural strength properties. Thus, in the production of building units having high strength to weight characteristics, the unexfoliated variety of pumicite utilized exactly as the same comes from the deposit is more suitable because of the greater compaction that is obtained during molding of the units. It should be pointed out that the particles of volcanic ash material do not pop and expand during the firing of the complete unit because of the compaction obtained in molding of the unit, and this phenomenon will be more fully explained hereinafter.

Particulate aggregates which are most suitable for the present process include those known commercially as pre-fired, bloated, vesicular shales, clays, slates, slags and volcanic rocks which have been bloated or expanded under the action of heat. These vesicular, bloated aggregates are to be distinguished from the pre-fired volcanic material referred to above principally in the larger particle size and the fact that the aggregates have a considerably higher median fusion temperature. The vesicular clays, shales, slates, slags and volcanic rocks utilizable in the present process most usually have been bloated at a temperature between 2000° F. and 3000° F. and thus have a median fusion temperature considerably above the sintering temperature of the bentonite and the volcanic ash material, such as pumicite. The bloated substances, whether found in an expanded condition naturally or bloated artificially in rotary kilns or the like, many times are found or are produced in a clinker state and thus must be reduced to a suitable size by grinding.

As an example of clays and shales which have the property of bloating or expanding under the action of heat within the range of 2000° F. to 3000° F., reference is made to such clays and shales found in the State of Kansas and which are classified by the State Geological Survey of Kansas as consisting of five separate systems named, in order, the Pennsylvanian, Permian, Cretaceous, Tertiary and Quaternary. A preferred bloated shale of the Pennsylvanian variety is bloated and marketed by the Carter-Waters Corporation, Kansas City, Missouri, under the trade name "Haydite" and which is especially suitable for production of building units having the desired compressive strength charcteristics for construction of buildings, and which is sufficiently light to permit formation of a block weighing substantially less than conventional lightweight aggregate cement units.

Analyses of expandable clays and shales found in the State of Kansas show that the chemical composition of the materials varies greatly from deposit to deposit and that the various substances included from 34% to 75% $SiO_2$, 9% to 23% $Al_2O_3$, 1.6% to 8.3% $Fe_2O_3$, from a negligible amount to 2.5% of $TiO_2$, 0.4% to 12% of CaO, 0.06% to 14.5% of MgO, 1% to 3.8% of $K_2O$, 0.19% to 2% of $Na_2O$, from traces to .034% of $P_2O_5$, and very small amounts to over 1% of $SO_3$.

Expandable slates are oftentimes grouped under the category of shales and thus are utilizable as aggregates because of the similar characteristics thereof, and vesicular slags which are obtained as a by-product of blast furnace operations are utilizable, particularly those obtained during the production of iron and similar metals. An example of a suitable vesicular mica is vermiculite which is most suitable in the production of lightweight building units having high insulating characteristics and low thermal conductivity, although compressive strength tests on the completed product indicate that the highly vesicular nature of the vermiculite tends to lower the compressive strength of the completed unit.

Scoria, a bloated volcanic rock material found in various areas including New Mexico, has also been determined to be highly satisfactory in the formation of building units having high compressive strength to weight properties and such volcanic rock is to be distinguished from the volcanic ash known by the name pumicite. It should be pointed out at this time that pumicite or volcanic ash is a more or less finely divided powder or dust made up of small, sharp, angular grains of volcanic glass of about the same composition as pumice, while volcanic rock is much larger in size. During eruption of a volcano, lava flows out of the cone of the same as a stream or sheet; if it is explosive because of included gases, the molten magma is brought out in fragmental or dust-like form. The material resulting from explosive eruptions of the volcano may be derived from solidified volcanic material filling the cone vent or it may be produced from blowing of fragments of the still liquid material into the air. The coarser blocks of volcanic material thrown into the air are called bombs while smaller or intermediate fragments are known as lapilli and the very finest material is called volcanic ash or pumicite. According to size, they are roughly classified as follows: particles the size of an apple or larger are called blocks if thrown into the air in the form of solid fragments and bombs if ejected as particulated, still fluid magma; those the size of a nut are termed lapilli; and particles the size of a pea or smaller are termed volcanic ashes. Scoria, a bloated volcanic rock material falling within the block, bomb and lapilli classification and often termed volcanic cinders, is highly vesicular in nature and therefore, especially adapted for utilization in formation of building blocks according to the present process. Scoria aggregate has a median fusion temperature within the specified 2000° F. to 3000° F. range and thus has optimum characteristics adapting the same for production of lightweight ceramic building units.

The particulate aggregates described above are commercially available in various forms wherein the particles are of different sizes and thus the vesicular material is said to have a specified gradation. The gradation which is most suitable for the present process is that set up by the cement block manufacturing industry as a standard for aggregates used in the production of cement blocks. This standard specifies that 70% of the material must pass through a ¼ inch screen size, while 30% must pass through a ⅜ inch mesh screen. Manifestly, grading aggregates over screens of this nature results in a proportion of fines being included in the final composition, the quantity of which will vary somewhat according to the time of grinding and the equipment utilized. As pointed out above with respect to the pumicite bonding material, which also contains a certain proportion of fines, the very fine particles of aggregate fuse at a somewhat lower temperature than the larger particles of the same and therefore, the aggregate is said to have a median fusion temperature. The reason for this phenomenon is again the fact that fine particles more readily receive heat than the larger particles and thus tend to melt or fuse at a lower temperature.

An example of a preferred building unit produced in accordance with the concepts of the present method is set forth below. All of the ingredients are calculated as parts by weight of the dry ingredients:

| | Lbs. |
|---|---|
| Bentonite (Wyoming deposit) | 2 |
| Pumicite | 4 |
| Bloated shale ("Haydite") | 94 |
| Water | 16 |
| Borax | 0.5 |
| Polyfon T | 0.2 |

The amounts above indicated are merely to represent relative proportions of the ingredients, and the amount incorporated into each batch will necessarily depend upon the equipment available and the number of building units desired to be formed in a designated period of time. The bentonite is gradually and progressively sifted into the volume of water as the water is stirred or agitated so that the bentonite is fully distributed and saturated with water and will thereby absorb a maximum amount of the water to produce a binding slurry. This slurry is then admixed with the pumicite and bloated shale which have been previously mixed in a suitable machine to produce a substantially homogeneous, moist, moldable mass. The borax and polyfon T may either be incorporated into the water or into the dry ingredients as desired. The moist mass which is somewhat tacky in nature is removed from the mixing machine and thus is in condition for immediate molding. This molding operation is most comonly performed in either one of two types of machines and the type which may be used most advantageously will vary with the physical characteristics which the block must possess, as well as the condition of the mass prior to molding. For example, if it is desired that the block have maximum compressive strength, the moist mass may be molded in a standard compression molding machine utilized widely in the brick and clay industry for producing bricks and blocks of high compressive strength. Thus, utilizing a compression molding machine to mold the moist mass into units the size and shape of a standard brick, it was determined that a building unit molded under a pressure of 3000 lbs. per square inch and then dried and fired had a compressive strength of over 7000 lbs. per square inch when subjected to standard testing procedures. A building unit made in accordance with this procedure weighs substantially less than an ordinary brick, yet retains the same or greater compressive strength constants than standard "A" bricks utilizing brick clays.

However, because of the condition of the moist mass after admixing of the basic components, it is ordinarily most advantageous to mold the mass in a standard vibrating machine. The degree of compaction of the materials is not as great in a vibrating machine and thus the building unit is lighter in weight than those produced with a compression machine, but the building unit so produced retains compression constants equal to or better than similar cement blocks while the unit is much lighter. Blocks produced by molding in a vibration machine and suitably fired at temperatures to be hereinafter described gave compression tests in excess of 1000 lbs. per square inch and were suitable for all types of structural wall requirements. The exact pressure to which the building unit is subjected during molding will vary with the circumstances and ranges from approximately 5 lbs. per square inch in certain types of vibrating machines to over 15,000 lbs. per square inch in mechanical or hydraulic presses. Ordinarily, the type of building unit desired with respect to density and size, as well as the physical condition of the moist mass prior to molding, will dictate the molding machine which is used, lightweight, relatively porous building units being formed in the vibrating machine while substantially non-porous, dense units are constructed in the presses.

After molding of the moist mass into the desired shape of the prescribed size, the formed blocks are then placed on pallets or the like and passed through a suitable drying oven. It should be pointed out that the Polyfon T set forth in the example above is a plasticizing agent produced by West Virginia Pulp and Paper Company, Charleston, South Carolina, and operates to materially increase the green strength of the molded unit both before drying and after drying thereof. Various glues and organic binders are utilizable in place of the Polyfon T but the latter has been found to give the best results for the intended purposes and effectively prevents cracking of the molded blocks or bricks between the time the same are removed from the mold, passed through the drying oven and then directed into the kilns. Polyfon T is a sodium lignosulfonate derived from alkali lignin. The proportion of Polyfon T or other suitable plasticizing agents may vary but it is preferred from both technical and economical aspects to limit the plasticizing agent to an amount within the range of 0.1% to 0.2% by weight of the admixture.

Drying of the formed units may be effected either in a kiln of the type wherein the pallets are placed upon carts and passed longitudinally therethrough from one end to the other, or the same may be dried in ovens wherein the pallets are pushed through an opening in the oven, allowed to dry and then removed from the same opening. The temperature within the drying oven need only be sufficient to completely dry the building units within a practical length of time, but it has been found that passing the units through an elongated oven having an entrance at one end thereof and an outlet at the other end thereof is the most satisfactory from a commercial standpoint and materially lessens the cost of the overall operation. The maximum temperature within the drying oven should be approximately 400° F., but it has also been determined that maintenance of the oven at a range within 200° to 250° F. will produce satisfactory results at a lower cost, inasmuch as it is not necessary to maintain the oven at the higher temperature of 400° F. If continuous drying through an elongated oven is employed, passage of the formed units through an oven maintained at 400° F. for a period of 10 hours has been found sufficient to remove substantially all of the moisture from the formed units. The drying operation should be controlled to such an extent as to remove all of the water from the blocks without causing fissures and cracks in the same by virtue of the water being changed to steam under influence of the heat in the oven and attempting to escape from the solid components of the block at too fast a rate. By maintaining the oven within the prescribed ranges, it has been found there is little or no danger of steam being produced which would deleteriously affect the formed building units. Complete drying of the building units in a suitable oven causes the dried blocks to have sufficient green strength to be handled because of the hydraulic bond which is created during evaporation of the water from the formed blocks and the suction thereby produced which holds the grains of material together and maintains them in the desired shape until they have been permanently bonded together during the firing cycle.

After the blocks have been completely dried within the drying oven, the same are conducted to a suitable firing kiln. Since the blocks may be readily handled after drying thereof, it is most usually the most practical method to remove the building units from the pallets upon which the same were initially disposed and stack the dry blocks on suitable kiln carts. These kiln carts containing the stacked blocks, which may be from 20 to 25 layers high, are then pushed into a kiln at the specified temperature. Again it is to be noted that an elongated kiln having an entrance and an outlet is the most desirable type of structure, inasmuch as a continuous operation may be maintained as kiln carts are uninterruptedly moved into the kiln, moved therethrough at a preselected rate, and subsequently removed from the kiln at the opposite end thereof. The temperature within the kiln will depend upon the particular materials employed, as well as the end product desired and, at the outset, it is initially pointed out that the firing temperature should be sufficient to sinter the bentonite and the volcanic ash material but not sufficient to fuse or melt the larger particles of aggregate. With respect to the example set forth above, a block of over 1000 lbs. per square inch compressive strength and a brick of over 7000 lbs. per square inch of compressive strength were produced by subjecting the building units to a temperature of approximately 1920° F.

By raising the temperature of the building unit within the kiln to a temperature sufficient to sinter only the bentonite and the finely divided volcanic material, such as pumicite, and not the main proportion of the particles of aggregate, permanent bonding of the particles of aggregate together is obtained and a strong, lightweight building unit is produced which has a low coefficient of expansion and does not warp, crack or shrink during firing. Raising the temperature of the building units to the sintering point of the bentonite and the volcanic ash causes the same to become a coherent, solid mass without thoroughly melting and thus, the block retains its original shape throughout the firing process and does not warp or shrink. The exact sintering temperature of the bentonite and volcanic ash will vary depending upon the materials employed and the degree of division of particles of aggregate, as well as the bonding substances. As heretofore pointed out, the particle size of the aggregate and volcanic ash vary and thus, the small particles or fines, as they are known, more readily receive the heat than do the larger particles and tend to fuse or sinter at a lower temperature than the larger particles of the admixture. It is believed that the bentonite and volcanic ash form a eutectic mixture and that the sintering point of these substances is somewhat below the fusion temperature of each individual material. In this case, the fines of aggregate also contribute to the lowering of the fusion temperature of the bentonite and volcanic ash and tend to sinter with the bentonite and pumicite to permanently bond the larger particles of aggregate together. This eutectic phenomenon is of importance because the unit may be raised to the sintering temperature of the bentonite, volcanic ash and fines of the aggregate to permanently bond the larger particles of aggregate together without the necessity of raising the building unit to an elevated temperature which would tend to fuse, melt or sinter the larger particles of aggregate. In this way, warping and shrinkage of the unit is prevented during the firing procedure.

The exact temperature at which the building unit should be fired will vary as set forth above, but it has been determined that the most advantageous and efficient firing of the units may be effected in an elongated kiln of the type wherein kiln carts are loaded with building units and slowly advanced through the kiln at a predetermined rate. The optimum time in which the building units should remain within the kiln during advancement of the same therethrough has been found to be approximately 13½ hours, with the maximum temperature at the center of the kiln maintained within the range of 1800° F. to 2000° F. The most successful range has been determined to be within 1865° F. to 1975° F., while the time at which the building units are subjected to this maximum temperature will vary from 1 to 2 hours. It is to be noted that the sintering temperature of the admixture of bentonite, volcanic ash and fines of the aggregate is well below that of the larger particles of pre-fired, bloated clays, shales, slags, slates, micas and volcanic rocks. Another important advantage of utilizing bonding agents such as bentonite and volcanic ash to permanently tack the particles of aggregate together is the fact that by utilization of these materials, there is no breakdown of the building unit during the firing process because of the sintering of the bonding fraction. Although the bentonite loses its colloidality at a temperature somewhat below its sintering point, it is pointed out that this does not cause the block to crumble and fall apart before the bentonite and volcanic ash have sintered because the bentonite gradually loses its colloidality from the surface toward the center thereof and thus, breakdown of the block is effectively prevented. In other words, the bentonite in the outer portion of the block loses its colloidality first because the heat has not penetrated sufficiently into the block to raise the center thereof to the point where the bentonite in the center portion loses its colloidality, until the bentonite in the outer surface of the block has reached its sintering temperature, whereupon the inner portion of the block then is raised to a temperature where the bentonite therein loses its colloidality. This gradual process of the bentonite initially losing its colloidality and then being raised to its sintering point operates to prevent warping and shrinkage of the block during the firing and is a major reason for the success of the present building units. Another factor which contributes to prevention of breakdown of the block during the firing cycle is the fact that the volcanic ash sinters within a range rather than at a specified temperature. Thus, a portion of the volcanic ash sinters before other parts of the same and tacks the particles of aggregate together before there is any tendency of the same to break down and fall apart during the firing process.

The particles of pumicite do not pop or expand during firing of the building units at the elevated temperature within the range of 1800° F. to 2000° F. because of the way in which the same are compacted in the molded unit under the action of the vibrating compression molding machines. Expansion or popping of the volcanic ash material takes place only when the particles are substantially suspended in a suitable oven in a manner so that the same may readily pop under the influence of the heat.

The borax included in the preferred example set forth above operates as a fluxing agent during sintering of the bentonite and volcanic ash material and thus lowers the point at which the same become a coherent mass under the influence of the heat. Various fluxing agents may be employed in lieu of borax but this substance has been found to give the best results at the lowest concentration thereof. However, calcium hydroxide, sodium carbonate and potassium nitrate may also be employed with advantageous results. The amount of fluxing agent employed will necessarily depend upon the materials used, but from an economic standpoint, the proportion of such agent should be maintained at approximately ½% to 1% by weight of the total admixture.

The relative proportions of bentonite and volcanic ash employed with a specified clay, shale, slag, slate, mica or volcanic rock will necessarily vary with the circumstances, but it has been determined that the amount of bentonite should be within the range of ½ to 5 percent by weight of the total dry admixture, while the quantity of volcanic ash or similar materials should be within the range of approximately 1 to 10 percent by weight of the entire dry admixture. The best results, however, are obtained when the bentonite is maintained within a range of 2 to 3 percent by weight of the entire dry admixture while the pumicite or volcanic ash is kept within the range of 4 to 6 percent by weight of the dry materials employed. The building unit must contain a sufficient amount of the bentonite and volcanic ash to permanently bond all of the larger particles of aggregate together, and there must also be sufficient bentonite in the initial admixture to present a tacky, cohesive mass when water is added thereto prior to molding. As previously set forth, the fines of the aggregate also tend to sinter during the firing process and thus bond the larger particles of aggregate together but, manifestly, the proportion of aggregate fines must be kept within a certain range so that the complete unit will have the necessary compressive strength characteristics. The limits of bentonite and volcanic ash which are specified are dictated not only by commercial factors relating to the overall cost of the unit, but also must be kept within such ranges to prevent the sintered bentonite and volcanic ash from lowering the compressive strength of the block after firing.

If desired, a liquid glaze may be applied to any or all faces of the building unit after the same has beene dried and before the unit is placed on the kiln carts for passage through the kiln, and firing of the glaze is effected during sintering of the bentonite and volcanic ash. This process allows glazing of the blocks in a single firing operation and materially lessens the overall cost of producing glazed blocks, as well as making it possible to put a completely waterproof, vitreous surface on the block without subsequent glazing procedures being necessary. Various glazing substances which are well known in the art may be utilized, the only specification that must be observed being the firing temperature at which the block is heated. The glazing composition manifestly should be one that fires at approximately the same temperature at which the bentonite and volcanic ash sinter and to which the block is subjected within the kiln.

If a building unit of high insulating value rather than structural strength characteristics is desired, such a block may be readily produced by utilizing an aggregate having a higher fusion point than the bentonite and the volcanic ash and which is highly vesicular in nature so as to present suitable insulating properties, while structural strength is thereby sacrificed. Thus, vermiculite has been found to be a suitable substance which will produce insulating blocks that are very lightweight and yet will not warp or shrink during firing, and have a low coefficient of expansion. These blocks do not have the compressive strength properties of the units previously described, but are of utility in insulation of buildings, heating equipment, and similar uses.

Completely expanding the bentonite with water prior to admixing the same with the pumicite and expanded aggregate fractions is of importance in the present process because this assures that the bentonite is uniformly distributed among the particles of aggregate and pumicite to thereby aid in formation or molding of the block and, subsequently, to assure that permanent bonding or tacking of all of the particles of aggregate together takes place. Also, it is to be noted that in certain applications a more suitable building unit may be obtained by utilizing an admixture of exfoliated volcanic ash with unexfoliated volcanic ash to thereby render the outer surfaces of the finished block much smoother in appearance and to also increase the insulating characteristics of the finished unit. Various modifications such as this may be made to the present invention without departing from the spirit thereof and it is therefore intended to be limited only by the scope of the appended claims.

Having thus described the invention what is claimed as new and desired to be secured by Letters Patent is:

1. The method of producing a building unit comprising the steps of introducing approximately two parts by weight of a bentonite capable of swelling in the presence of water into approximately 16 parts by weight of water to form a slurry; admixing the slurry with approximately 4 parts by weight of pumicite and 94 parts by weight of pre-fired, bloated, vesicular shale; forming the admixture into a building unit; drying the unit at a temperature within the range of 250° F. to 400° F. for a time sufficient to remove substantially all of the water therefrom; and firing the dried unit at a temperature within the range of 1860° F. to 1920° F. for a period sufficient to sinter the material and said bentonite and thereby effect permanent bonding of the particles of aggregate.

2. The method of producing a ceramic building unit comprising the steps of admixing swelling bentonite with a sufficient amount of water to produce a colloidal suspension of the bentonite in said amount of water to substantially its colloidal form; admixing the colloidalized bentonite with finely divided volcanic ash material and a particulate ceramic aggregate to form a tacky mass, said aggregate being selected from the group consisting of pre-fired, bloated, vesicular clays, shales, slags, slates, micas and volcanic rocks, the median fusion temperature of the particles of aggregate being higher than the median fusion temperature of the particles of bentonite and said material respectively, said bentonite constituting from approximately ½ to about 5 percent by weight of the total dry admixture, the volcanic ash material constituting from approximately 2 to about 10 percent by weight of the total dry admixture and the aggregate constituting substantially the remaining portion of said total admixture; forming the admixture into a building unit; and firing the unit at a temperature below said median fusion temperature of the aggregate and sufficiently high to sinter the bentonite and said material to thereby effect permanent bonding of the particles of aggregate.

3. A method as set forth in claim 2 wherein the median fusion temperature of the material is intermediate the median fusion temperatures of the aggregate and said bentonite respectively.

4. The method of producing a ceramic building unit comprising the steps of adding a bentonite capable of swelling in the presence of water to a volume of water sufficient to produce a colloidal suspension of the bentonite in said volume of water; admixing the colloidal bentonite with a finely divided volcanic ash material and a particulate ceramic aggregate to form a tacky mass, said aggregate being selected from the group consisting of pre-fired, bloated, vesicular clays, shales, slags, slates, micas and volcanic rocks, the median fusion temperature of the particles of aggregate being higher than the median fusion temperatures of the particles of bentonite and said material respectively, said bentonite constituting from approximately ½ to about 5 percent by weight of the total dry admixture, the volcanic material constituting from approximately 2 to about 10 percent by weight of the total dry admixture and the aggregate constituting substantially the remaining portion of said total admixture; forming the admixture into a building unit; heating the unit to a temperature below the median fusion temperatures of the bentonite and said material and sufficient to remove all of the water therefrom without producing deleterious fissures in the unit; and firing the unit at a temperature below said median fusion temperature of the aggregate and sufficiently high to sinter the bentonite and said material to thereby effect permanent bonding of the particles of aggregate.

5. The method of producing a ceramic building unit comprising the steps of adding a bentonite capable of swelling in the presence of water to a sufficient volume of water to produce a colloidal suspension of the bentonite in said volume of water; admixing the colloidalized bentonite with a finely divided volcanic ash material and a particulate ceramic aggregate to form a tacky mass, said aggregate being selected from the group consisting of pre-fired, bloated, vesicular clays, shales, slags, slates, micas and volcanic rocks, the median fusion temperature of the particles of aggregate being higher than the median fusion temperatures of the particles of bentonite and said material respectively, said bentonite constituting from approximately ½ to about 5 percent by weight of the total admixture, the volcanic material constituting approximately 2 to about 10 percent by weight of the total admixture and the aggregate constituting substantially the remaining portion of said total admixture; forming the admixture into a building unit; heating the unit to a temperature below the median fusion temperatures of the bentonite and said material and sufficient to remove all of the water therefrom without producing deleterious fissures in the unit; and firing the unit at a temperature within the range of about 1800° F. to approximately 2000° F. to sinter the bentonite and said material to thereby effect permanent bonding of the particles of aggregate.

6. A method as set forth in claim 5 wherein said material is pumice.

7. A method as set forth in claim 6 wherein said material is pumicite.

8. A method as set forth in claim 7 wherein said pumicite has been artificially expanded.

9. A method as set forth in claim 5 wherein the amount of material is approximately twice the proportion of bentonite calculated as parts by weight of the initially dry substances in said admixture.

10. A method as set forth in claim 5 wherein from approximately ½ to about 1 part by weight of the total admixture of a fluxing agent is added to said admixture to lower the median fusion temperatures of the particles of bentonite and said material.

11. A method as set forth in claim 5 wherein from approximately ½ to about 1 part by weight of the total admixture of a plasticizing agent is added to the admixture to prevent cracking of the unit during forming of the same.

References Cited in the file of this patent

UNITED STATES PATENTS 2,198,990    Cummins    Apr. 30, 1940
2,498,355    Bomgren    Feb. 21, 1950